United States Patent
Kim et al.

(10) Patent No.: US 9,998,924 B2
(45) Date of Patent: Jun. 12, 2018

(54) ELECTRONIC DEVICE AND METHOD FOR ACQUIRING BIOMETRIC INFORMATION THEREOF

(71) Applicant: SAMSUNG ELECTRONICS CO., LTD., Suwon-si, Gyeonggi-do (KR)

(72) Inventors: Sunghoon Kim, Osan-si (KR);
Changjin Song, Seoul (KR);
Myungcheol Lee, Suwon-si (KR);
Donghyun Yeom, Bucheon-si (KR);
Jiwoo Lee, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/442,831

(22) Filed: Feb. 27, 2017

(65) Prior Publication Data
US 2017/0265079 A1    Sep. 14, 2017

(30) Foreign Application Priority Data
Mar. 9, 2016    (KR) ........................ 10-2016-0028250

(51) Int. Cl.
*H04W 12/08*    (2009.01)
*H04L 29/06*    (2006.01)
*G06F 3/16*    (2006.01)
*G06F 3/01*    (2006.01)
*G06F 3/14*    (2006.01)

(52) U.S. Cl.
CPC ........... *H04W 12/08* (2013.01); *G06F 3/015* (2013.01); *G06F 3/1423* (2013.01); *G06F 3/165* (2013.01); *H04L 63/0853* (2013.01); *G06F 2221/2111* (2013.01); *H04M 2203/6054* (2013.01); *H04M 2250/12* (2013.01)

(58) Field of Classification Search
CPC .............. H04W 12/08; H04L 63/0853; H04M 2203/6054; H04M 2250/12; G06F 3/165; G06F 3/015; G06F 3/1423; G06F 2221/2111
USPC ................... 455/410–412.2, 414.1, 418–420
See application file for complete search history.

(56) References Cited

U.S. PATENT DOCUMENTS

| | | | |
|---|---|---|---|
| 9,134,768 B2 | 9/2015 | Yoon | |
| 2006/0057966 A1* | 3/2006 | Mise | H04W 8/245 455/67.13 |
| 2009/0060170 A1* | 3/2009 | Coughlan | H04M 1/605 379/433.02 |

(Continued)

FOREIGN PATENT DOCUMENTS

| KR | 10-2013-0025979 | 3/2013 |
|---|---|---|
| KR | 10-2015-0000293 | 1/2015 |

(Continued)

*Primary Examiner* — Michael Mapa
(74) *Attorney, Agent, or Firm* — Nixon & Vanderhye P.C.

(57) ABSTRACT

A method and an apparatus for acquiring and using biometric information of a user in an electronic device are provided. According to an example embodiment of the present disclosure, the method may include executing a call function using a communication module included in the electronic device, outputting a voice signal depending on the execution of the call function through a sound output device included in the electronic device, and acquiring, by a sensor included in the electronic device, biometric information of the user of the electronic device while the call function is executed.

20 Claims, 14 Drawing Sheets

(56) References Cited

U.S. PATENT DOCUMENTS

| | | | | |
|---|---|---|---|---|
| 2009/0061819 A1* | 3/2009 | Coughlan | .......... | G07C 9/00158 455/410 |
| 2010/0105426 A1* | 4/2010 | Jaiswal | ................ | H04M 1/575 455/556.1 |
| 2011/0059777 A1* | 3/2011 | Rao | ........................ | G06F 21/32 455/566 |
| 2011/0261143 A1* | 10/2011 | Ponsford | ............... | G06F 1/1694 348/14.02 |
| 2012/0086551 A1* | 4/2012 | Lowe | ................... | H04M 1/605 340/6.1 |
| 2013/0316686 A1* | 11/2013 | Subbaramoo | ......... | H04W 12/02 455/418 |
| 2015/0190094 A1 | 7/2015 | Lee et al. | | |
| 2015/0201065 A1* | 7/2015 | Shim | ................ | H04M 1/72569 455/556.1 |
| 2015/0319168 A1* | 11/2015 | McCarty | ............ | H04L 63/0861 713/186 |
| 2016/0021521 A1* | 1/2016 | Lee | ........................ | H04W 4/22 455/404.1 |

FOREIGN PATENT DOCUMENTS

| | | |
|---|---|---|
| KR | 10-1502346 | 3/2015 |
| KR | 10-2015-0082029 | 7/2015 |

\* cited by examiner

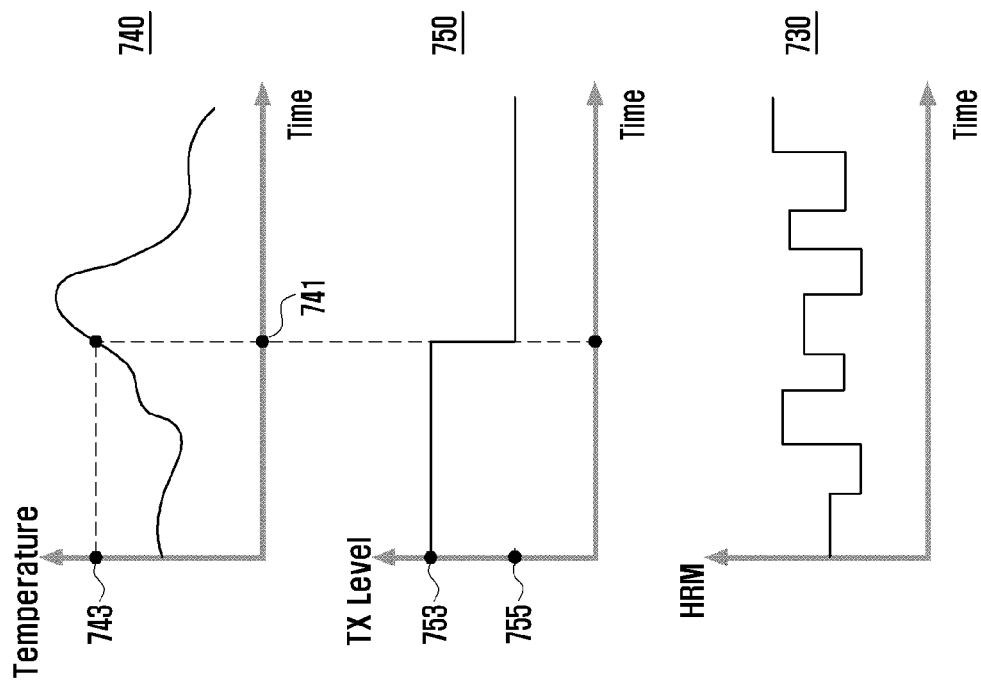
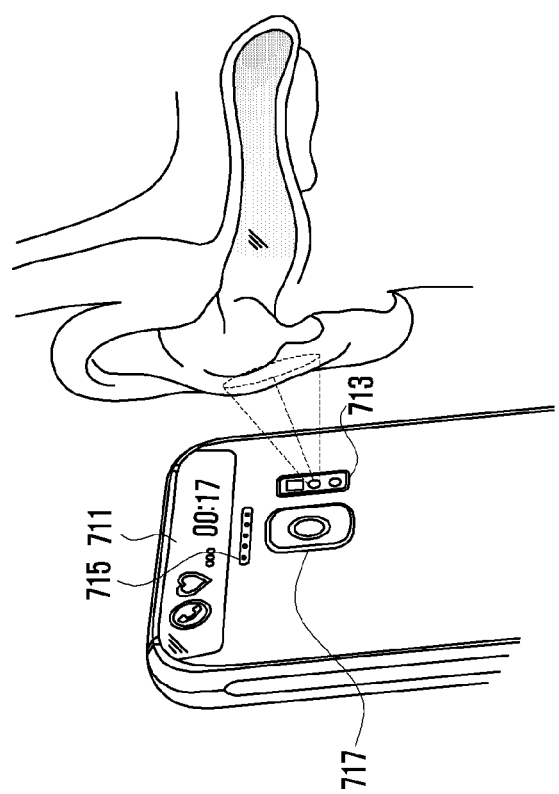
FIG. 7

ELECTRONIC DEVICE AND METHOD FOR ACQUIRING BIOMETRIC INFORMATION THEREOF

CROSS-REFERENCE TO RELATED APPLICATION

This application is based on and claims priority under 35 U.S.C. § 119 to a Korean patent application filed on Mar. 9, 2016 in the Korean Intellectual Property Office and assigned serial number 10-2016-0028250, the disclosure of which is incorporated by reference herein in its entirety.

TECHNICAL FIELD

The present disclosure relates generally to a method and an apparatus for acquiring and using biometric information of a user in an electronic device.

BACKGROUND

With the development of mobile communication technologies, an electronic device has been used as an individual communication apparatus. The electronic device has offered various additional services such as a voice communication function, a camera, data communication, video playing, audio playing, a messenger, schedule management, and an alarm function and has used various programs that may use each of the additional services.

The electronic device may process various kinds of inputs by various input methods or various input means and transmit and receive data by various communication schemes. The electronic device may perform various functions such as a telephone, a message, photographing, video photographing, media playing, social network service (SNS), health care, game, broadcasting viewing and listening, and scrapbook. The electronic device may perform various records or generate or download various contents while performing these functions.

Further, the electronic device may have at least one sensor disposed therein and obtain information on the surroundings of the electronic device using the at least one sensor. The obtainable surrounding information may include location information of the electronic device and information on a slope, surrounding illumination, or the like and may also include biometric information of a user using the electronic device, or the like.

Meanwhile, the biometric information of the user using the electronic device may be acquired by the electronic device including a specific sensor. However, there is a problem in that a position of the specific sensor that may be included in the electronic device is limited depending on a size or a purpose of the sensor. Therefore, an action of acquiring, by the electronic device, the biometric information may hardly be performed simultaneously with other functions of the electronic device and there are many restrictions of using the acquired biometric information in real time.

SUMMARY

Various example embodiments of the present disclosure relate generally to the provision of a method and an apparatus for acquiring a biometric signal of a user using an electronic device in real time and controlling at least one function of the electronic device or other electronic devices connected to the electronic device based on the acquired biometric signal.

Various example embodiments of the present disclosure provide an electronic device, comprising: a communication module comprising communication circuitry; a sound output device comprising sound output circuitry; a sensor; a processor electrically connected to the communication module, the sound output device, and the sensor; and a memory electrically connected to the processor, wherein the memory stores instructions and the processor is configured to execute the instructions to perform a call function using the communication circuitry of the communication module, to output a voice signal based on the performance of the call function through the sound output circuitry of the sound output device, and to acquire, by the sensor, biometric information of a user of the electronic device while the call function is executed.

Various example embodiments of the present disclosure provide a method for acquiring biometric information during a call in an electronic device, comprising: =executing a call function using a communication module included in an electronic device; outputting a voice signal based on the execution of the call function through a sound output device included in the electronic device; and acquiring, by a sensor included in the electronic device, biometric information of a user of the electronic device while the call function is performed.

BRIEF DESCRIPTION OF THE DRAWINGS

The above and other aspects, features and attendant advantages of the present disclosure will become more readily apparent and understood from the following detailed description, taken in conjunction with the accompanying drawings, in which like reference numerals refer to like elements, and wherein:

FIG. 7 is a diagram illustrating an example method for using biometric information of a user in an electronic device according to various example embodiments of the present disclosure;

DETAILED DESCRIPTION

Figure 1:
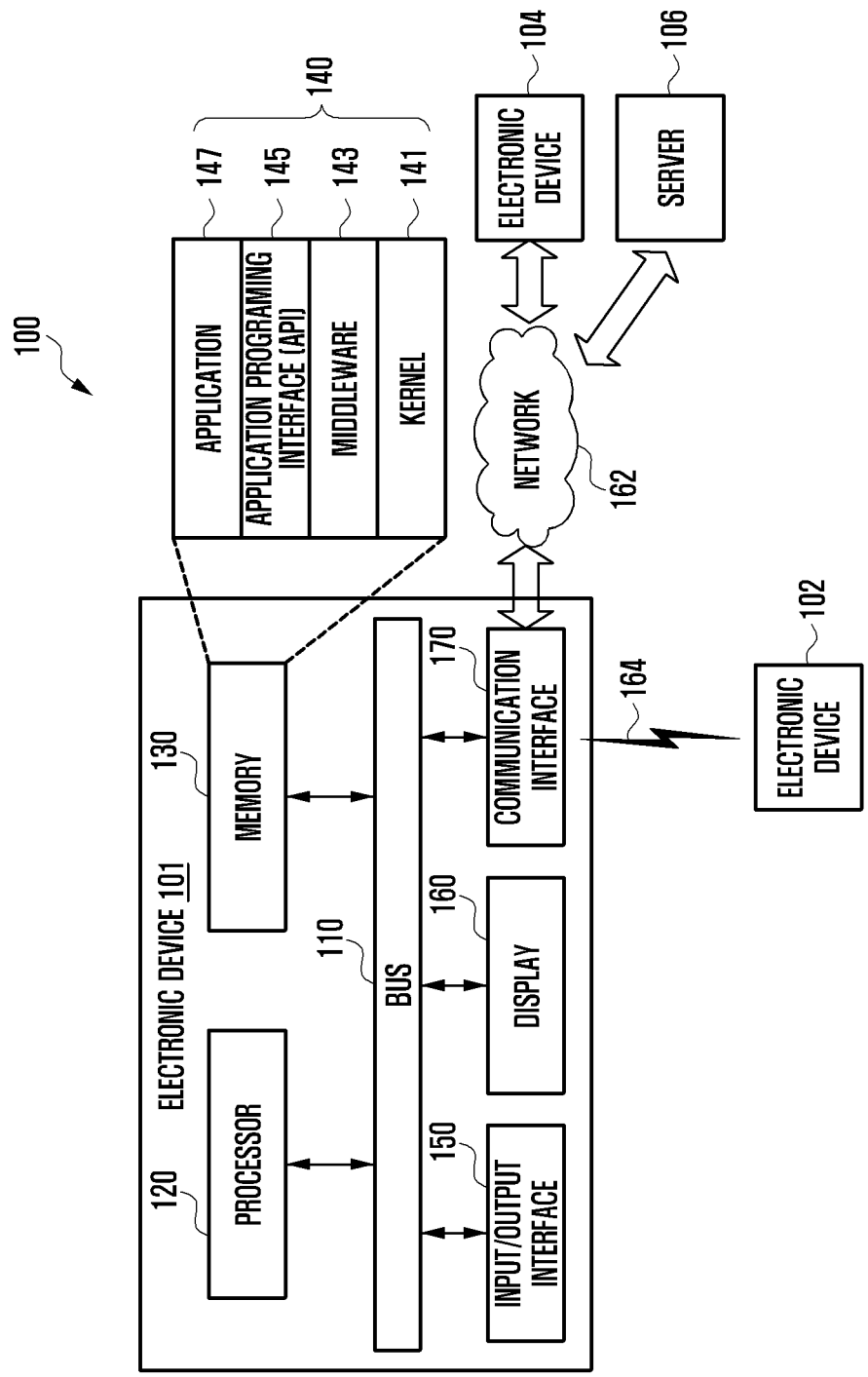
FIG. 1 is a diagram illustrating an example network environment including an electronic device according to various example embodiments of the present disclosure.

Hereinafter, example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an example of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols 164, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
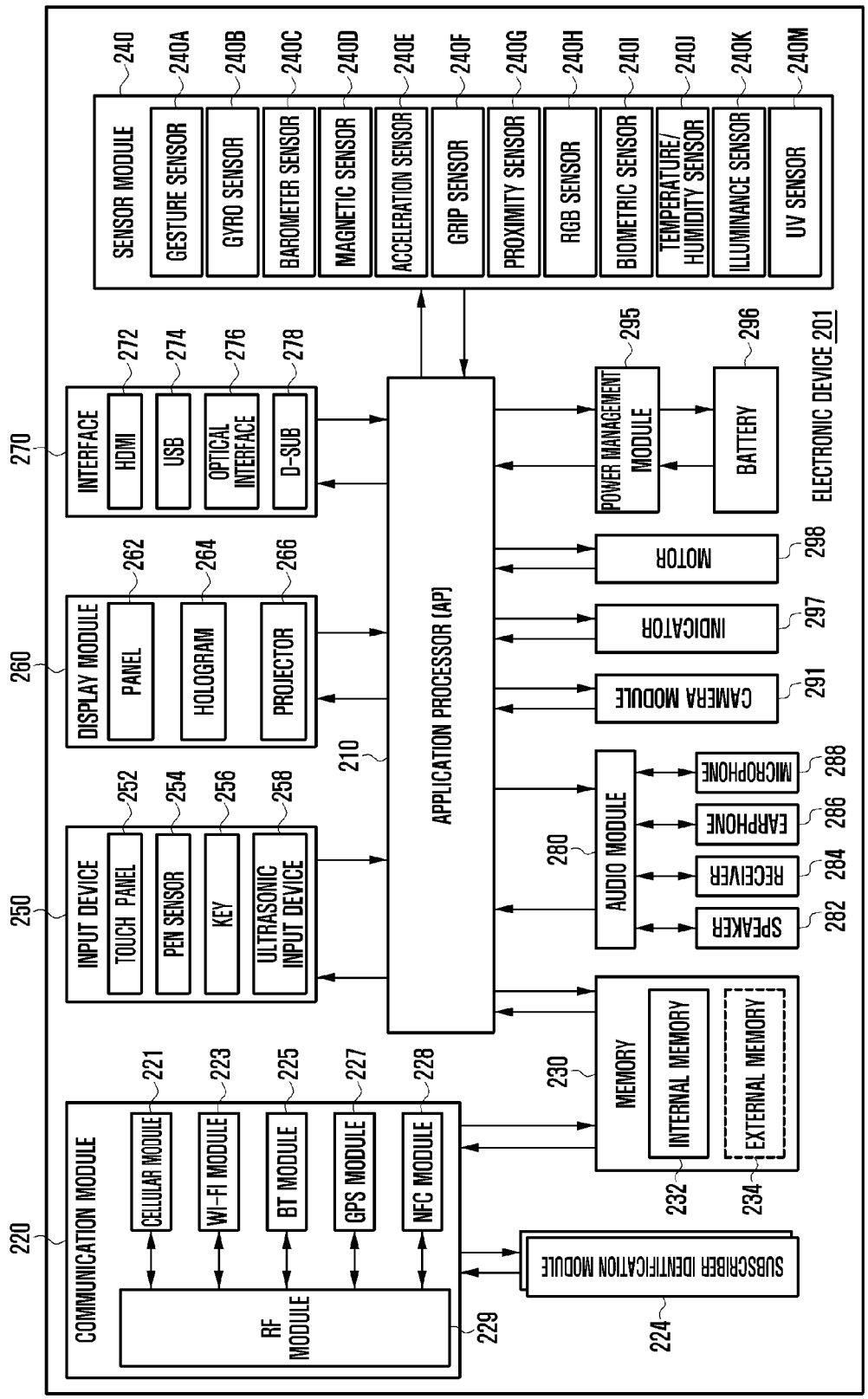
FIG. 2 is a block diagram illustrating an example electronic device according to various example embodiments of the present disclosure.

FIG. 2 is a block diagram illustrating an example electronic device 201 in accordance with an example embodiment of the present disclosure. The electronic device 201 may form, for example, the whole or part of the electronic device 101 shown in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 260 shown in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
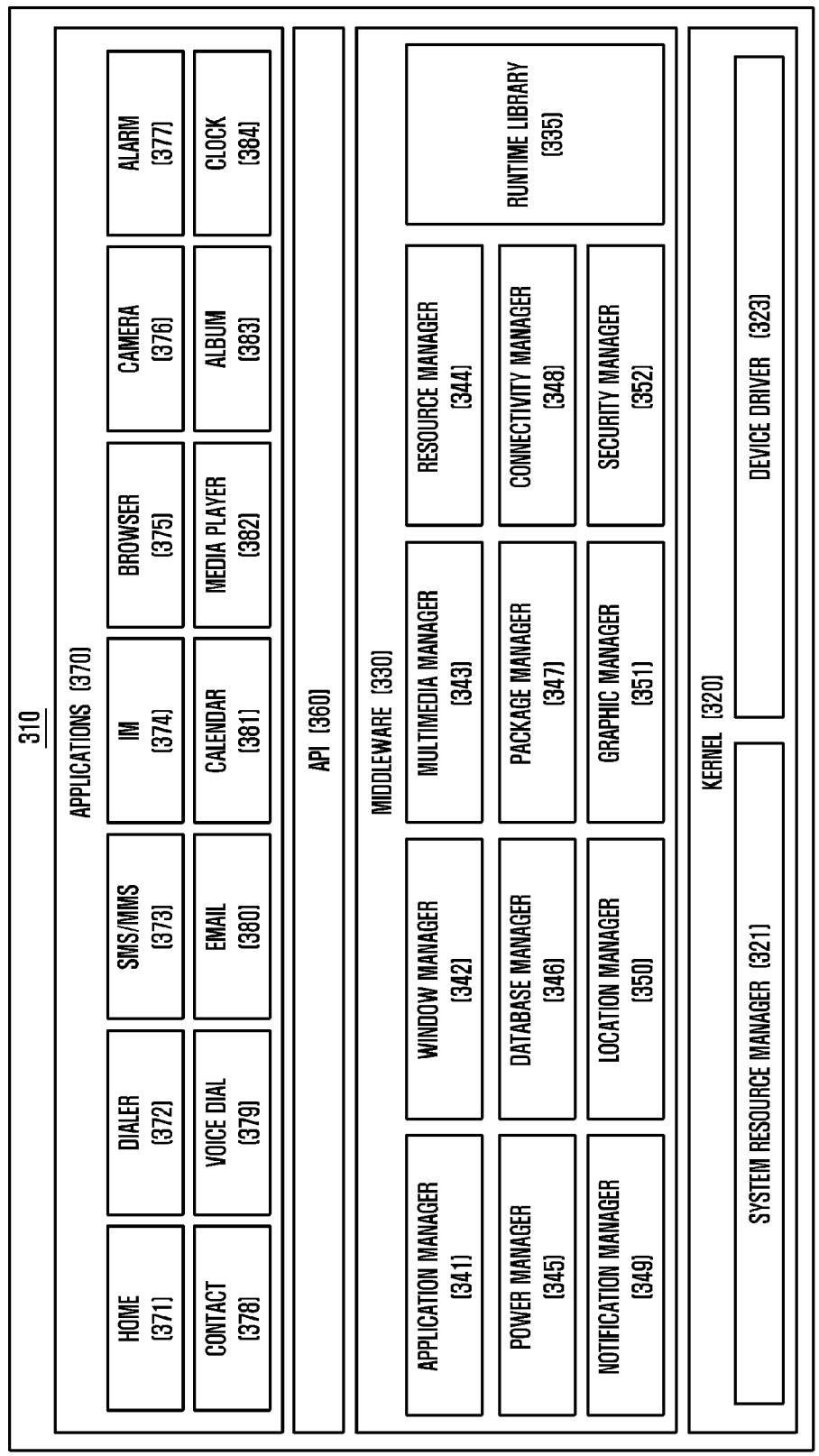
FIG. 3 is a block diagram illustrating an example program module according to various example embodiments of the present disclosure.

FIG. 3 is a block diagram illustrating an example configuration of a programming module 310 according to an example embodiment of the present disclosure.

The programming module 310 may be included (or stored) in the electronic device 201 (e.g., the memory 230) illustrated in FIG. 2 or may be included (or stored) in the electronic device 101 (e.g., the memory 130) illustrated in FIG. 1. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

As one of various embodiments of the present disclosure, the display driver may control at least one display driver IC (DDI). The display driver may include the functions for controlling the screen according to the request of the application 370.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

An electronic device according to various embodiments of the present disclosure includes a communication module comprising communication circuitry, a sound output device comprising sound output circuitry, a sensor, a processor electrically connected to the communication module, the sound output device, and the sensor, and a memory electrically connected to the processor, in which the memory may store instructions, the processor configured to execute the instructions to perform a call function using the communication circuitry of the communication module, to output a voice signal in response to the execution of the call function through the sound output circuitry of the sound output device, and to acquire biometric information of a user of the electronic device through the sensor while the call function is executed.

The electronic device according to various embodiments of the present disclosure, the memory may store instructions which the processor is configured to execute to acquire a body temperature or a heart rate as at least a part of the biometric signal.

In the electronic device according to various embodiments of the present disclosure, the memory may store instructions which the processor is configured to execute to control an action of the electronic device associated with the call function on the basis of the biometric signal.

In the electronic device according to various embodiments of the present disclosure, the action of the electronic device may include adjusting a transmitter power level using the communication module or an action of changing sound attributes of the voice signal.

In the electronic device according to various embodiments of the present disclosure, the memory may store instructions which the processor is configured to execute to perform the action of the electronic device associated with the call function at a first level if the biometric information includes is a first biometric signal and to perform the action of the electronic device associated with the call function at a second level if the biometric information includes a second biometric signal.

In the electronic device according to various embodiments of the present disclosure, the memory may store instructions which the processor is configured to execute to control a first function of the electronic device if the biometric information includes a first biometric signal and to control a second function of the electronic device if the biometric information includes a second biometric signal.

In the electronic device according to various embodiments of the present disclosure, the memory may store instructions which the processor is configured to execute to control at least some functions of a first application using the first function and to control at least some functions of a second application using the second function.

In the electronic device according to various embodiments of the present disclosure, the electronic device further includes a display and the memory may store instructions which the processor is configured to execute to display a first content on the display if the biometric information includes a first biometric signal and to control a second content on the second display if the biometric information includes a second biometric signal.

In the electronic device according to various embodiments of the present disclosure, the electronic device includes a sensor disposed on a first surface thereof and a display disposed on a second surface thereof and the memory may store instructions which the processor is configured to execute to control the display depending on the execution of the call function.

In the electronic device according to various embodiments of the present disclosure, the electronic device further includes another display formed on the first surface of the electronic device and the memory may store instructions which the processor is configured to execute to selectively display information corresponding to the biometric information or information corresponding to the executed call function on the display or the another display.

In the electronic device according to various embodiments of the present disclosure, the electronic device includes a sensor disposed on a first surface thereof and another sensor disposed on a second surface of the electronic device and the memory may store instructions which the processor is configured to execute to control the action of the electronic device or the another electronic device based on the information acquired through another sensor.

Figure 4:
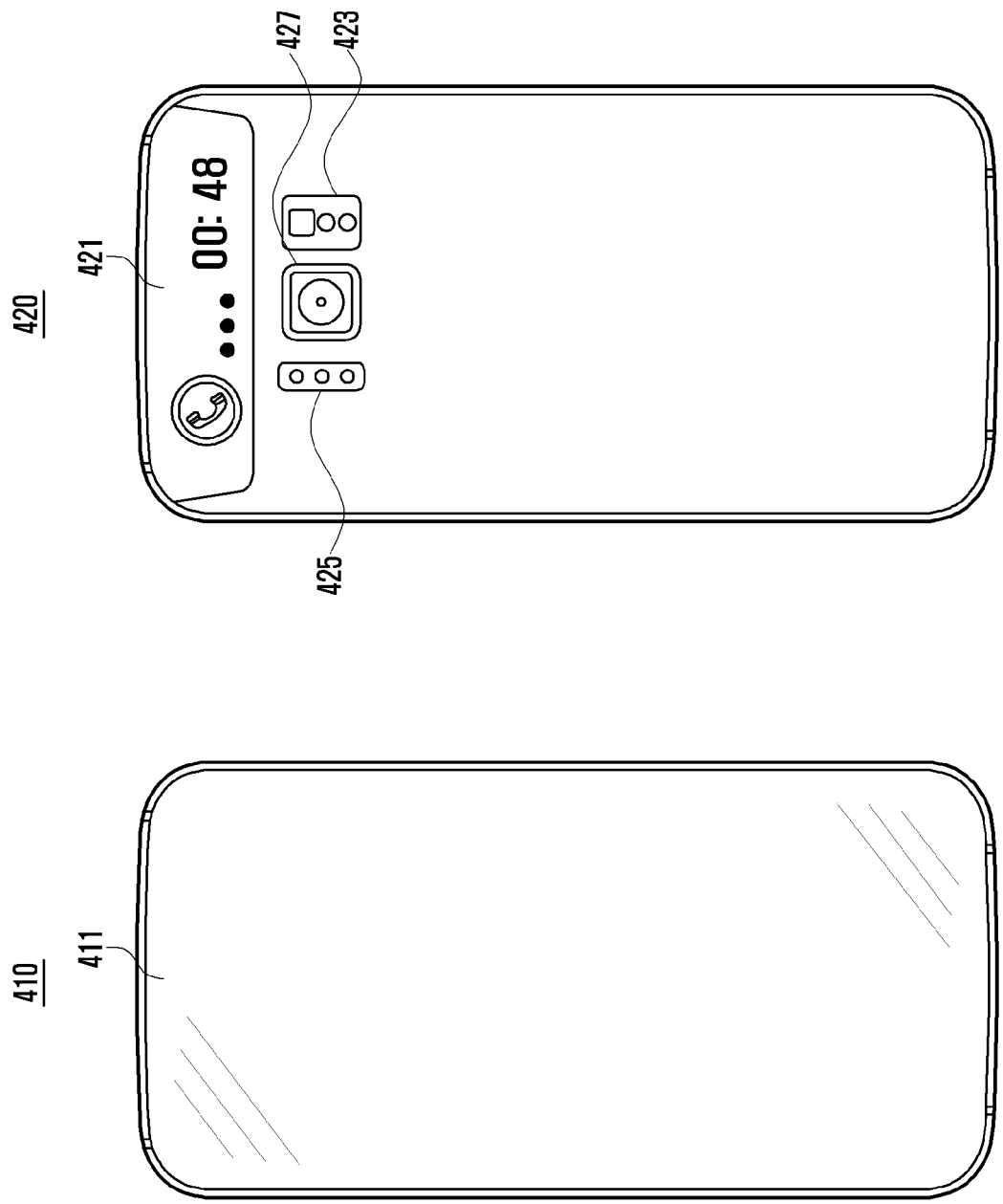
FIG. 4 is a diagram illustrating an example electronic device for acquiring biometric information according to various example embodiments of the present disclosure.

FIG. 4 is a diagram illustrating an example electronic device for acquiring biometric information according to various example embodiments of the present disclosure.

An electronic device according to an embodiment of the present disclosure may include a first display 411 (for example: display 260 of FIG. 2), a second display 421, a biometric recognition sensor 423 (for example: 240I of FIG. 2), a sound output device 425 (for example: receiver 284 of FIG. 2), or a camera module 427 (for example: camera module 291 of FIG. 2).

According to various embodiments, the first display 411 may be provided in a form in which it covers the whole of one surface of the electronic device, as represented by reference numeral 410 and may be used as a main display unit in the electronic device. According to various embodiments, the first display 411 may include a touch panel and may receive a touch input. According to various embodiments, the first display 411 may include a hovering sensor and may sense an approach of a specific object. According to various embodiments of the present disclosure, the touch panel may include a pressure sensor (or "force sensor") that may measure pressure intensity of a user touch and may variously control the function of the electronic device depending on how much pressure the user presses the display. According to various embodiments of the present disclosure, at least some region of the first display 411 may include a biometric recognition sensor (for example: fingerprint sensor) and may recognize biometric information (for example: fingerprint) of a user using the biometric sensor. The first display 411 may have as hole-less structure.

According to various embodiments of the present disclosure, the electronic device may include a second display 421 on a surface different from a surface on which the first display 411 is positioned. The second display 421 may include the touch panel and in the second display 421 panel, a lower end of a vertical stacking structure may be provided with at least one sensor (for example: biometric recognition sensor, hovering sensor, or the like). The second display 421 may be provided in a form in which it covers the whole of one surface of the electronic device and may also be provided in a form in which it covers at least a part of one surface of the electronic device depending on the purpose of the electronic device.

According to various embodiments of the present disclosure, the electronic device 102 (for example; processor 120) may display different contents on the first display 411 and the second display 421 depending on the setting of the user. Alternatively, the electronic device 102 (for example: processor 120) may display some of the contents displayed on the first display on the second display 421 in an extended form.

According to various embodiments of the present disclosure, the sound output device 425 (for example: receiver 284 of FIG. 2) may be positioned on one surface of the electronic device and may be provided to be positioned on another surface (for example: the same surface as the second display 421) different from the surface on which the first display 411 is positioned. The sound output display 425 may be used for the purpose of outputting a voice of a called party when the user uses the electronic device to perform a call function. The sound output device 425 may be used as a speaker depending on the setting. According to various embodiments of the present disclosure, the biometric recognition sensor 423 may be provided to be positioned on the same surface as the sound output device 425 in the electronic device. The biometric recognition sensor 423 may acquire a body temperature or a heart rate of the user of the electronic device.

For example, the biometric recognition sensor 423 may include a heart rate monitor sensor (hereinafter, HRM sensor).

According to various embodiments of the present disclosure, when at least a part of the user's body is sensed by the biometric recognition sensor 423 in a contact or contactless form, the biometric recognition sensor 423 may start to measure the biometric information of the user. For example, when the user puts the biometric recognition sensor 423 included in the electronic device on his/her ear, the electronic device may start to measure the heart rate of the user or the body temperature of the user using the biometric recognition sensor 423.

According to various example embodiments of the present disclosure, the camera module 427 (for example: camera module 291 of FIG. 2) may be provided to be positioned on the same surface as the biometric recognition sensor 423 in the electronic device. The camera module 427 may acquire an image or an image data. The electronic device may control at least one function driven on the electronic device on the basis of the image or image data acquired through the camera module 427.

The positions of the second display 421, the biometric recognition sensor 423, the sound output device 425, or the camera module 427 represented by reference numeral 420 of FIG. 4 are defined to easily describe the electronic device according to an example embodiment of the present disclosure, and according to the purpose, for example, the biometric recognition sensor 423 contacts his/her ear to measure the biometric signal and therefore the position thereof may be changed to an optimal location (for example: the position where the biometric recognition sensor 423 contacts a position where a skin is thinnest in an ear is defined as the position of the biometric recognition sensor 423 when the biometric recognition sensor 423 puts on the ear of the user to use the sound output device 425) to easily measure the biometric signal.

Figure 5:
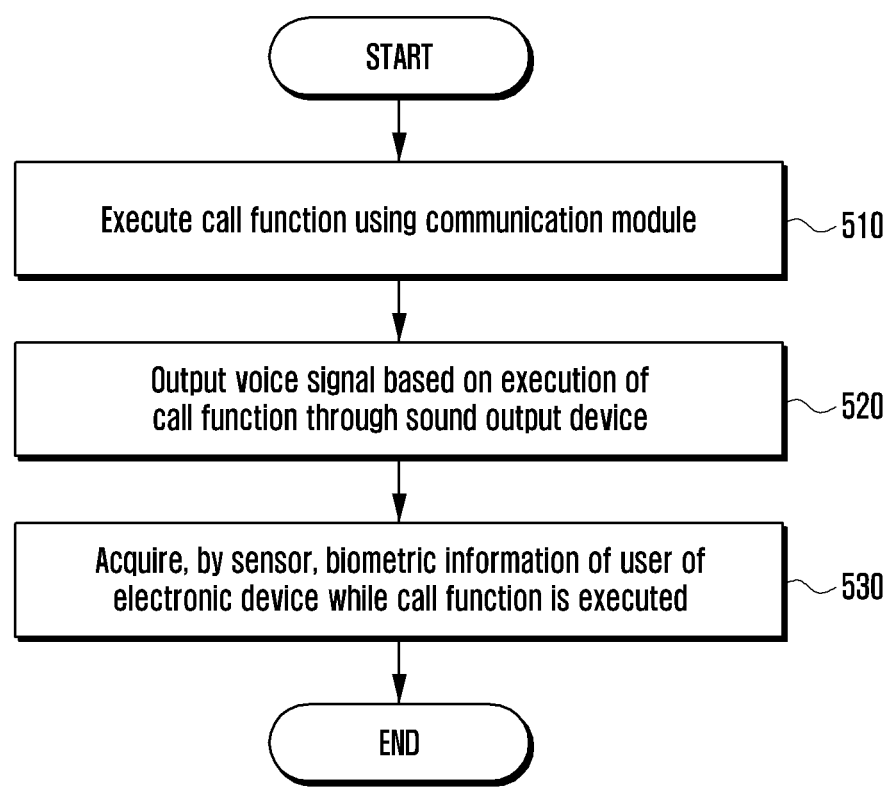
FIG. 5 is a flowchart illustrating an example method of acquiring biometric information during a call in an electronic device according to various example embodiments of the present disclosure.

FIG. 5 is a flowchart illustrating an example method of acquiring biometric information during a call in an electronic device according to various example embodiments of the present disclosure.

When the call function is executed in the electronic device 101 (for example: processor 120) according to an example embodiment of the present disclosure, the electronic device 101 (for example: processor 120) may acquire the biometric information of the user in real time using the call function using the electronic device 101 while the call function is executed.

In greater detail, in operation 510, a signal corresponding to the execution of the call function may be transmitted and received through the communication circuitry of the communication module included in the electronic device 101. For example, when the user inputs a telephone number of a called party using the electronic device 101 and then executes a call function, the electronic device 101 may transmit the signal corresponding to the execution of the call function to, for example, another electronic device 102 or 104 through the communication module.

In operation 520, the electronic device 101 may output the voice signal based on the execution of the call function through the sound output device included in the electronic device 101 The sound output device may output the voice of the called party.

In operation 530, the electronic device 101 may acquire the biometric information of the user of the electronic device through at least one sensor included in the electronic device 101 during the execution of the call function. According to an example embodiment of the present disclosure, the at least one sensor may be provided to be positioned on the same surface as the sound output device 425 of the electronic device 101. When the user puts the sound output device 425 of the electronic device 101 on his/her ear for call, at least one sensor positioned on the same surface as the sound output device 425 may be contacted to some of the user's body in a contact or contactless form. For example, at least one sensor may contact the ear of the user of the electronic device and may acquire information associated with the heart rate of the user through the ear or the body temperature of the user through the ear.

Figure 6:
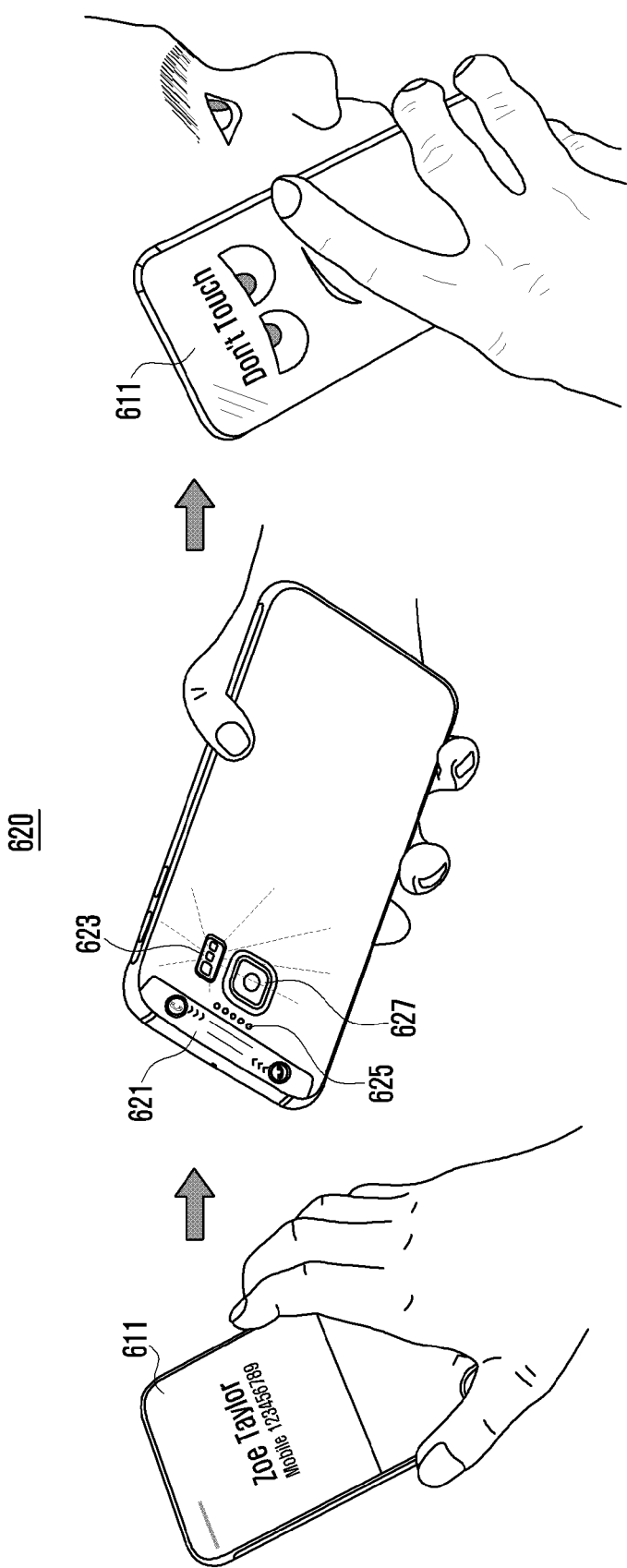
FIG. 6 is a diagram illustrating an example process of performing a call function in an electronic device according to various example embodiments of the present disclosure.

FIG. 6 is a diagram illustrating an example process of performing a call function in an electronic device according to various example embodiments of the present disclosure.

A first display 611 may be disposed on one surface of the electronic device according to an embodiment of the present disclosure and a second display 612, at least one sensor 623, a sound output device 625, or a camera module 627 may be disposed on a surface different from a surface on which the first display 611 is disposed.

Referring to FIG. 6, the call request may be received through the communication module of the electronic device according to an example embodiment of the present disclosure. For example, the user may confirm that he/she has a call from a specific user through the first display 611 disposed on one surface of the electronic device. When a call request is received, at least one of the second display 612, the at least one sensor 623, the sound output device 625, or the camera module 627 may be driven. For example, the electronic device may display information corresponding to the call request on the second display 621 and may drive at least one sensor 623 to acquire the biometric information of the user. Further, the electronic device may drive the sound output device 625 to allow the user to receive the voice of the called party and operate the camera module depending on the setting to acquire an image or an image data.

When the call request is received, the user may take up the electronic device so that his/her palm faces the first display 611 as represented by reference numeral 620 and the user may put his/her face on the electronic device so that the sound output device 625 may contact the ear of the user. The user may set the specific content to be displayed on the first display 611 during the call.

FIG. 7 is a diagram illustrating an example method for using biometric information of a user in an electronic device according to various example embodiments of the present disclosure.

The electronic device according to an example embodiment of the present disclosure may include at least one display 711, at least one sensor 713, a sound output device 715, or a camera module 717 that are disposed on one surface of the electronic device. Further, the at least one sensor 713 disposed on one surface of the electronic device may include a biometric recognition sensor.

According to an example embodiment of the present disclosure, the user may perform a call using the electronic device. The user may put the sound output device 715 disposed on one surface of the electronic device on the ear of the user to listen to the voice of the called party. When the call function is executed, at least one sensor 713 positioned on the same surface as the sound output device 715 may be driven and the electronic device may acquire the information associated with the user of the electronic device through the at lest one sensor 713. The at least one sensor 713 according to an example embodiment of the present disclosure may contact the ear of the user to sense the biometric signal. For this purpose, the sensor 713 may be disposed at the position which may contact the position where the skin is thinnest in the ear or the position where the heart rate is easily measured in the body part.

For example, at least one sensor included in the electronic device may include a body temperature sensing sensor or an HRM sensor. The electronic device may acquire the information on the body temperature of the user who talks over the electronic device or the information on the heart rate in real time through the body temperature sensing sensor or the HRM sensor. When the biometric information of the user who talks over the electronic device is acquired in real time, the function of the electronic device or at least one of other electronic devices connected to the electronic device may be controlled on the basis of the acquired biometric information.

Reference numerals 730 to 750 of FIG. 7 are graphs an example of the biometric information of the user acquired by the electronic device. The electronic device 102 (for example: processor 120) may control different functions on the basis of the biometric information acquired from the biometric recognition sensor 423.

Reference numeral 740 is a graph illustrating the change in the body temperature of the user over time. Reference numeral 750 represents a graph illustrating a change in a transmitter power level (hereinafter, referred to as TX level) over time. Reference numeral 730 represents an HRM value (heart rate) of the user over time.

According to an example embodiment of the present disclosure, the electronic device 102 (for example, processor 120) may use the body temperature of the user that is acquired in real time to confirm the heat generation state of the electronic device 102. The electronic device may lower the TX level of the electronic device to a value corresponding to 753 on the graph to a value corresponding to 755 on the graph when the body temperature of the user exceeds a specific temperature (for example, temperature corresponding to 743 on the graph). In this way, the action of controlling the transmitter power level may be performed using the communication module.

According to an example embodiment of the present disclosure, the electronic device 102 (for example, processor 120) may use the biometric information of the user acquired in real time to analyze the emotional change of the user, the voice tone of the user, or the like who talks over the phone. For example, when the heart rate of the user is measured as being quicker and quicker, it may also be determined that the user is in an excited condition. The electronic device may store the biometric information of the user in the memory or the server and analyze the accumulated biometric information or compares with the analysis information on other users to more accurate determine the state of the user. When it is determined that the electronic device 102 (for example: processor 120) is in the excited state, the electronic device 102 may perform processing to smoothly output the voice output from the sound output device 425. Alternatively, the electronic device 102 (for example: processor 120) may lower a voice volume of the user who is in the excited state or may smoothly process the voice of the user and transfer the processed voice to other parties who talk over the phone. By doing so, it is possible to change attributes on a sound to which the user may listen by adjusting the voice signal that may be output through the sound output device. The sound attributes may include the output sound volume and the extent at which the user smoothly listens to the sound.

Figure 8:
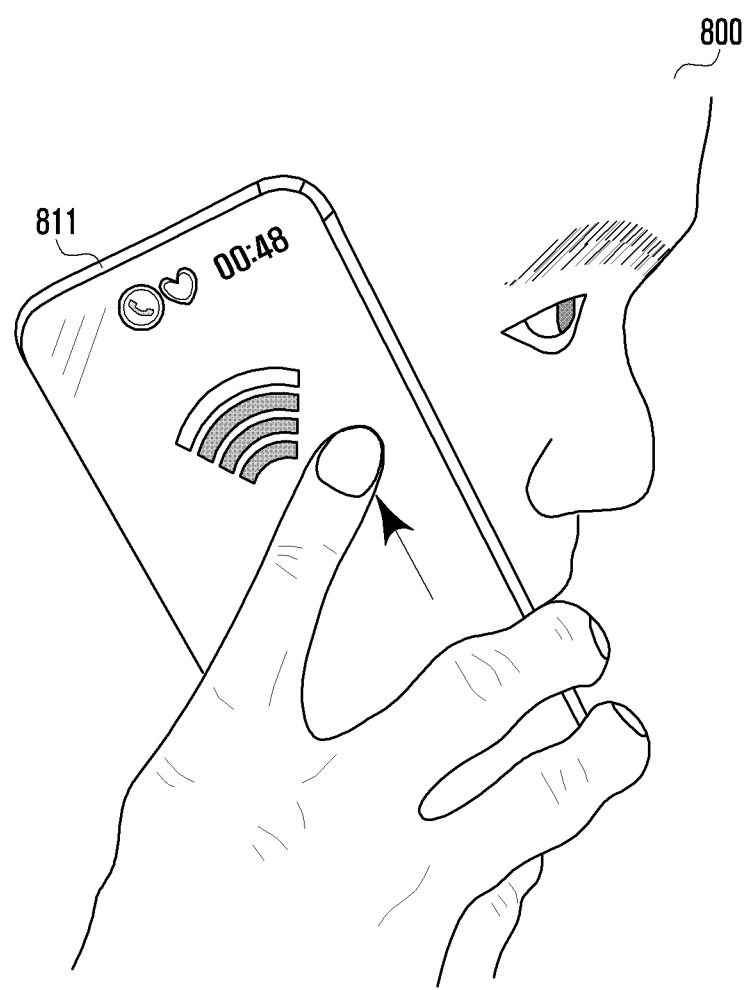
FIG. 8 is a diagram illustrating an example action of performing a specific function during a call in an electronic device according to various example embodiments of the present disclosure.

FIG. 8 is a diagram illustrating an example action of performing a specific function during a call in an electronic device according to various example embodiments of the present disclosure.

The electronic device according to an example embodiment of the present disclosure may include the sound output device that outputs a voice of another party that talks over the phone and may have a structure in which a display 811 is disposed on a surface different from the surface on which the sound output device is disposed. A user 800 may put the electronic device on his/her face so that the sound output device included in the electronic device contacts the ear of the user 800. In this case, the electronic device may receive the input through the display 811 disposed on the surface that does not contact the user's face. For example, the electronic device may increase or decrease a size of a call volume on the basis of a touch input (for example: gesture pattern or pressure intensity) of the user received through the display 811. Alternatively, a ring tone may be recorded on the basis of the touch input of the user. Further, the electronic device may display a user interface corresponding to the change in the volume size on the display 811.

Figure 9:
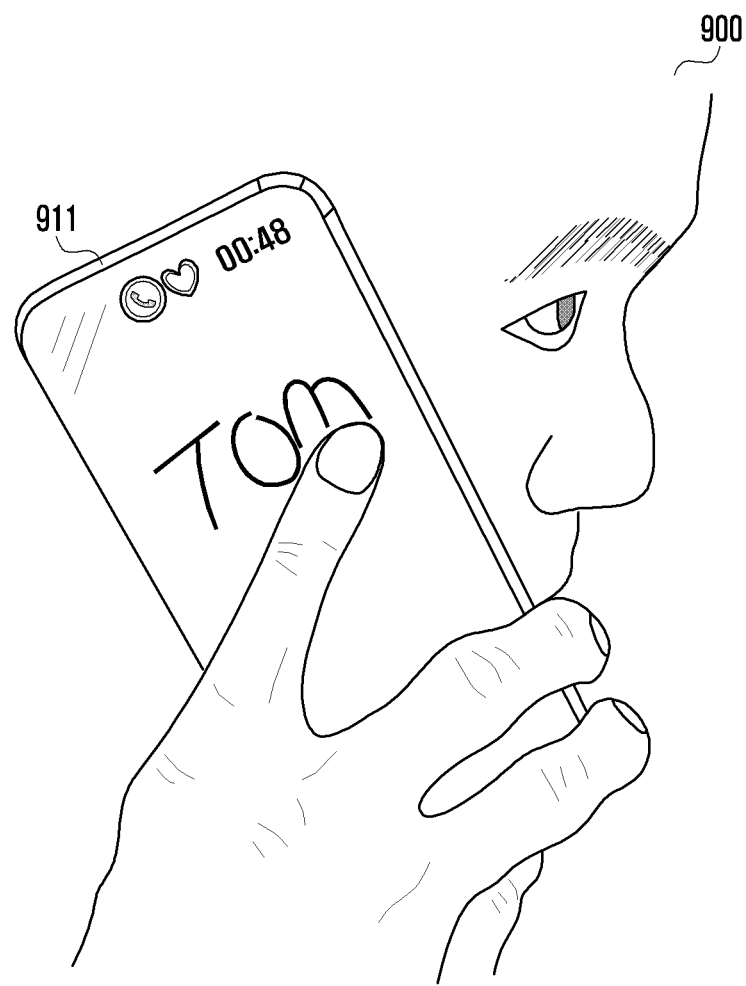
FIG. 9 is a diagram illustrating an example action of performing a specific function during a call in an electronic device according to various example embodiments of the present disclosure.

FIG. 9 is a diagram illustrating an example action of performing a specific function during a call in an electronic device according to various example embodiments of the present disclosure.

The electronic device according to an example embodiment of the present disclosure may include the sound output device that outputs a voice of another party that talks over the phone and may have a structure in which a display 911 is disposed on a surface different from the surface on which the sound output device is disposed. A user 900 may put the electronic device on his/her face so that the sound output device included in the electronic device contacts the ear of the user 900. In this case, the electronic device may receive the input through the display 911 disposed on the surface that does not contact the user's face. For example, the electronic device may store the information corresponding to the touch input of the user received through the display 911. That is, the user may use the display 911 like a memo pad. Alternatively, the electronic device 102 (for example: processor 120) may process characters corresponding to the touch input of the user acquired through the display 911 during a call so as to transmit the characters to an external electronic device as a message.

Figure 10:
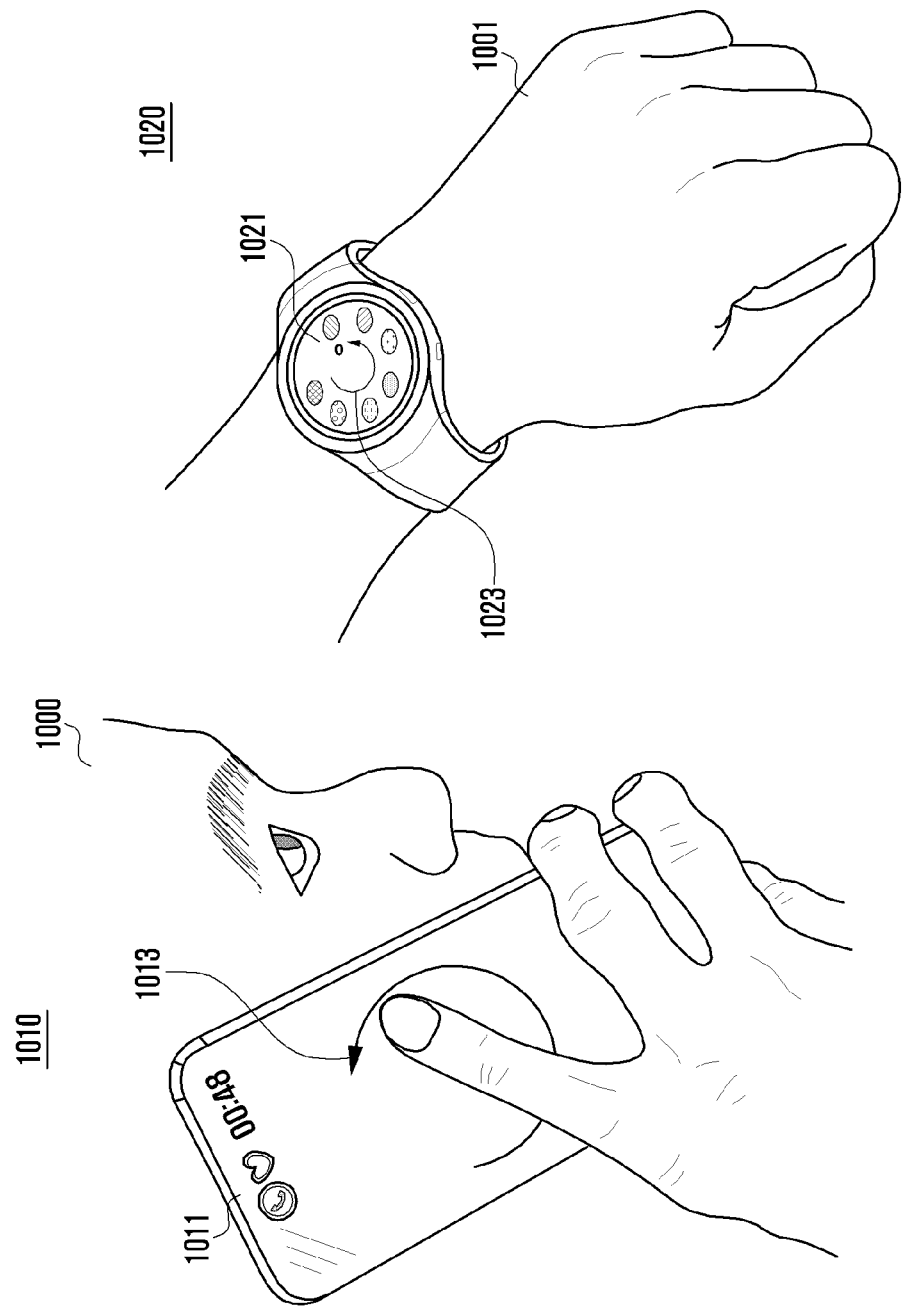
FIG. 10 is a diagram illustrating an example action of performing a specific function during a call in an electronic device according to various example embodiments of the present disclosure.

FIG. 10 is a diagram illustrating an example action of performing a specific function during a call in an electronic device according to various example embodiments of the present disclosure.

The electronic device according to an example embodiment of the present disclosure may include the sound output device that outputs a voice of another party that talks over the phone and may have a structure in which a display 1011 is disposed on a surface different from the surface on which the sound output device is disposed. Further, the electronic device may be connected to other electronic devices through the communication module.

For example, a first electronic device 1010 may be connected to a second electronic device 1020 that wears a user's wrist 1001. A user 1000 may put the first electronic device 1010 on his/her face so that the sound output device included in the first electronic device 1010 performing a call function contacts an ear of the user 1000. The first electronic device 1010 may receive the input through the display 1011 disposed on the surface that does not contact the user's face.

According to an example embodiment of the present disclosure, the first electronic device (for example: processor 120) may acquire the biometric information (for example: fingerprint) of the user through the biometric sensor (for example: fingerprint sensor) included in at least a part of the display 1011. The first electronic device 1010 may use the biometric information to perform authentication for connection to the second electronic device 1020. When the authentication is completed, the electronic device 1010 may use the communication module to set the connection to the second electronic device 1020 and may be changed to a state for controlling the second electronic device 1020. According to an example embodiment of the present disclosure, the user 1000 may input a gesture (or touch pressure intensity) like 1013 through the display 1011 of the first electronic device. The second electronic device 1020 connected to the first electronic device 1010 may perform an action corresponding to the gesture 1013 input through the display 1011 of the first electronic device 1010. In this case, an action 1023 of changing the user interface of the second electronic device 1020 as the correspondence to the gesture 1013 that the user inputs may be performed and the change action may be displayed on the display unit 1021 of the second electronic device 1020. That is, the user that talks over the phone through the electronic device may use the electronic device to perform the action of executing or changing at least one function of the electronic device or other electronic devices connected to the electronic device.

FIGS. 8 to 10 illustrate various examples of functions that may be executed through the display of the electronic device during a call, in which the function executed through the display included in the electronic device during a call may be changed depending on the setting of the user. For example, when the electronic device 102 performs a call, the electronic device 102 may be set to a function of changing a content displayed on the first display, transferring content to the second display and displaying the content, turning on or off the display, adjusting the brightness of the display, or adjusting the image quality of the display.

FIGS. 11A, 11B, 11C and 11D are diagrams illustrating an example internal structure of the electronic device according to various example embodiments of the present disclosure.

The electronic device according to an example embodiment of the preset disclosure may include sound output devices 1103, 1123, 1143, and 1163, camera modules 1104, 1124, 1144, and 1164, at least one sensors 1105, 1125, 1145, and 1165, display panels 1107, 1127, 1147, and 1167, housings 1109 and 1149 of a transparent material or housings 1133 and 1173 of a metal material, brackets 1111 to 1114, 1131, 1151 to 1154, and 1171 to 1174, coil antennas 1115 and 1155, power suppliers 1117, 1137, 1157 and 1177 and printed circuit board (PCB) 1119, 1139, 1159, and 1179.

Figure 11A:
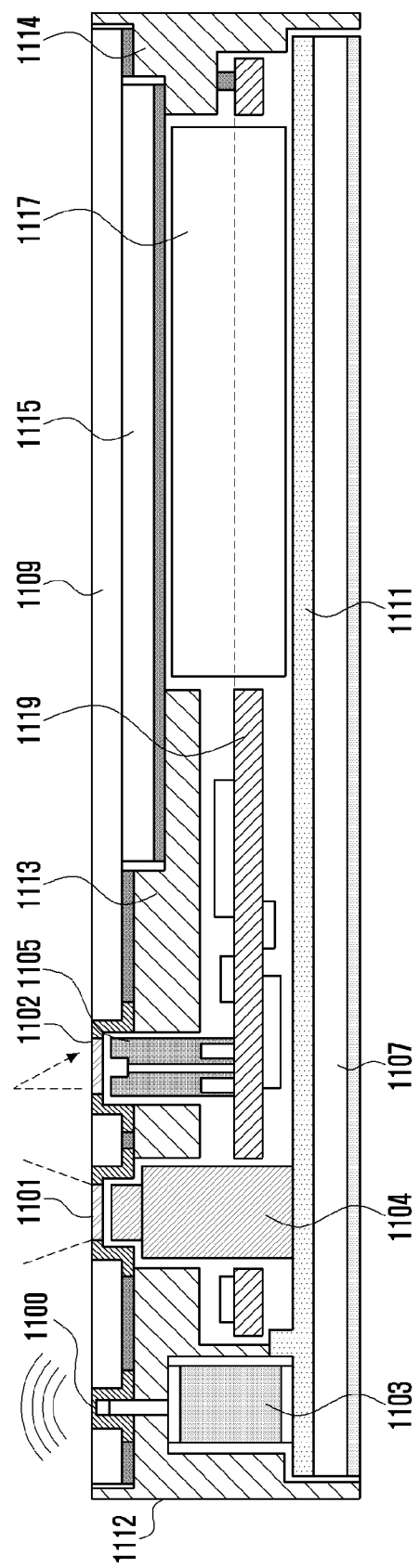
FIGS. 11A, 11B, 11C and 11D are diagrams illustrating an example internal structure of the electronic device according to various example embodiments of the present disclosure.

Referring to FIG. 11A, the voice information output through the sound output device 1103 included in the electronic device may be output through a first opening 1100 disposed on one surface of the electronic device. The camera module 1104 may acquire an image or an image data through a second opening 1101 that is disposed on the same surface as the first opening 1100 through which the voice information is output. At least one sensor 1105 may acquire the biometric information of the user of the electronic device through the third opening 1102 that is disposed on the same surface as the first opening 1100 through which the voice information is output. The surface on which the first opening 1100 to the third opening 1102 of the electronic device are disposed may be finished to the housing 1109 of a transparent material. Further, the electronic device may include antennas included in some parts 1112 to 1114 of the bracket that is included in the electronic device.

Figure 11B:
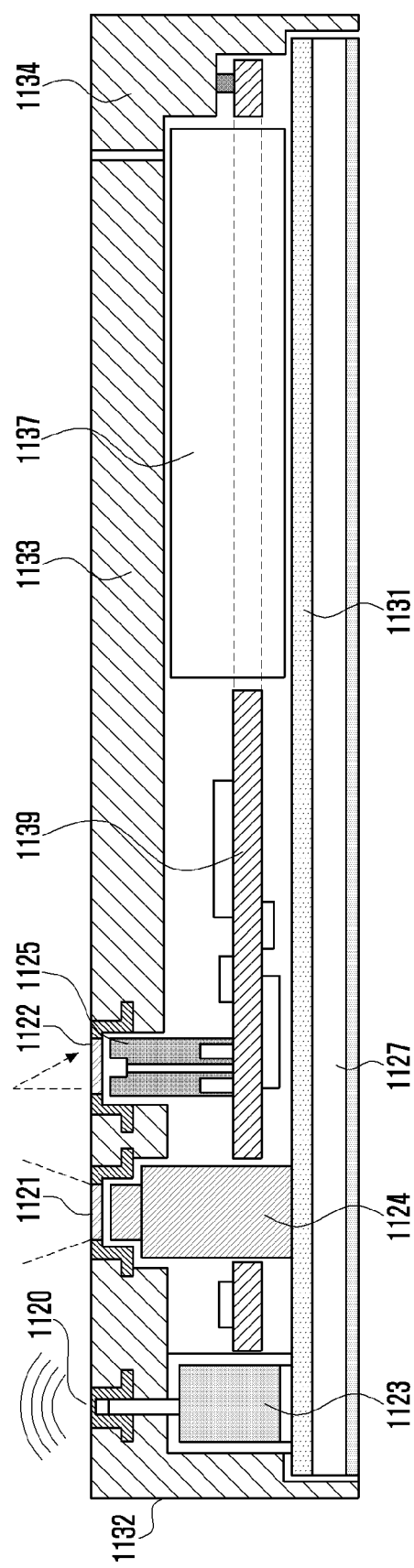

Referring to FIG. 11B, the voice information output through the sound output device 1123 included in the electronic device may be output through a first opening 1120 disposed on one surface of the electronic device. The camera module 1124 may acquire an image or an image data through a second opening 1121 that is disposed on the same surface as the first opening 1120 through which the voice information is output. At least one sensor 1125 may acquire the biometric information of the user of the electronic device through the third opening 1122 that is disposed on the same surface as the first opening 1120 through which the voice information is output. The surface on which the first opening 1120 to the third opening 1122 of the electronic device are disposed may be finished to the housing 1133 of a metal material. Further, the electronic device may include antennas included in some parts 1132 to 1134 of the bracket that is included in the electronic device.

Figure 11C:
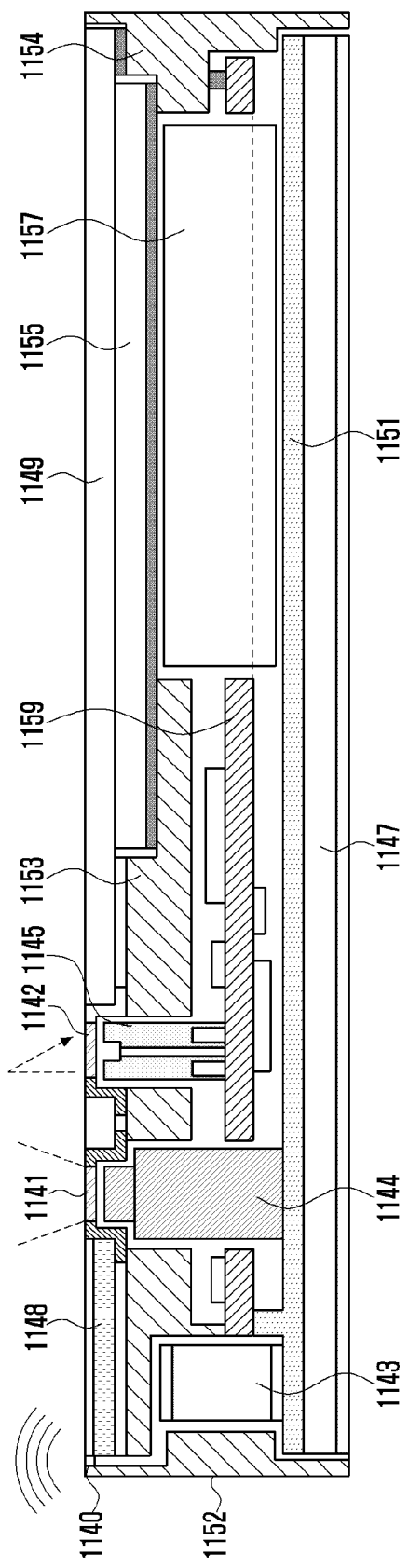

Referring to FIG. 11C, the electronic device according to an example embodiment of the present disclosure may include at least two displays 1147 and 1148. The voice information output through the sound output device 1143 included in the electronic device may be output through a first opening 1140 disposed on one surface of the electronic device. The first opening 1140 may be disposed by bypassing at least one display 1148 disposed on one surface of the electronic device. The camera module 1144 may acquire an image or an image data through a second opening 1141 that is disposed on the same surface as the first opening 1140 through which the voice information is output. At least one sensor 1145 may acquire the biometric information of the user of the electronic device through the third opening 1142 that is disposed on the same surface as the first opening 1140 through which the voice information is output. The surface on which the first opening 1140 to the third opening 1142 of the electronic device are disposed may be finished to the housing 1149 of a transparent material. Further, the electronic device may include antennas included in some parts 1152 to 1154 of the bracket that is included in the electronic device.

Figure 11D:
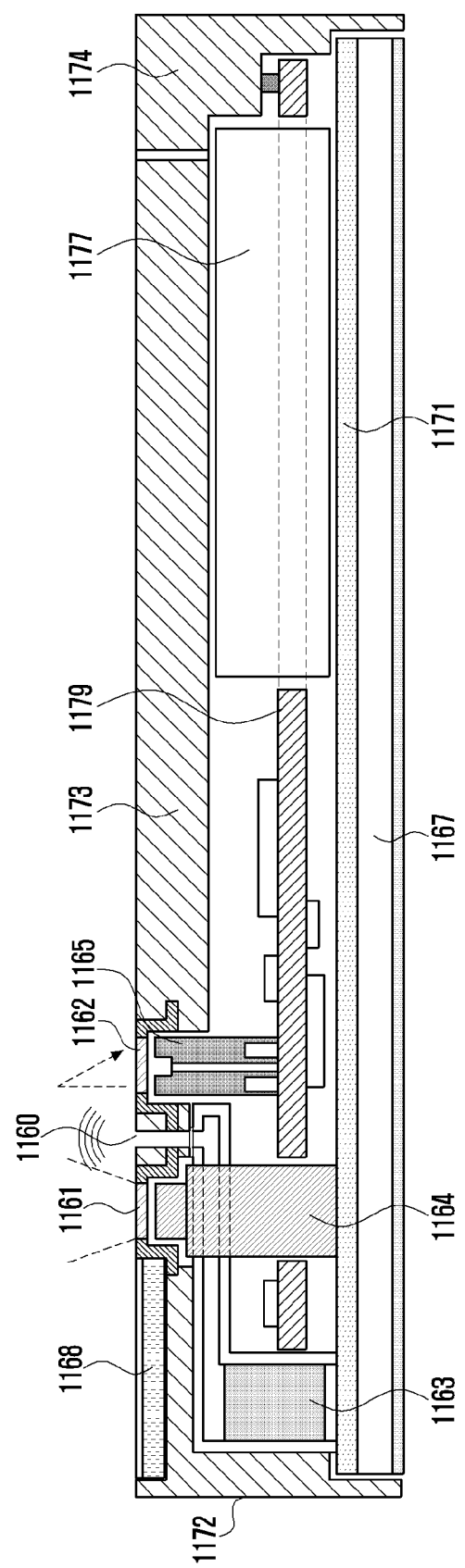

Referring to FIG. 11D, the electronic device according to an example embodiment of the present disclosure may include at least two displays 1167 and 1168. The voice information output through the sound output device 1163 included in the electronic device may be output through a first opening 1160 disposed on one surface of the electronic device. The first opening 1160 may be disposed by bypassing at least one display 1168 disposed on one surface of the electronic device. The camera module 1164 may acquire an image or an image data through a second opening 1161 that is disposed on the same surface as the first opening 1160 through which the voice information is output. At least one sensor 1165 may acquire the biometric information of the user of the electronic device through the third opening 1162 that is disposed on the same surface as the first opening 1160 through which the voice information is output. The surface on which the first opening 1160 to the third opening 1162 of the electronic device are disposed may be finished to the housing 1173 of a transparent material. Further, the electronic device may include antennas included in some parts 1172 to 1174 of the bracket that is included in the electronic device.

The method according to various example embodiments of the present disclosure may include executing the call function using the communication module included in the electronic device, outputting the voice signal depending on the execution of the call function through the sound output device included in the electronic device, and acquiring, by the sensor included in the electronic device, the biometric information of the user of the electronic device while the call function is executed.

In the method according to various example embodiments of the present disclosure, the acquiring may include acquiring the body temperature or the heart rate as at least some of the biometric information.

The method according to various example embodiments of the present disclosure may further include controlling the action of the electronic device associated with the call function based on the biometric information.

In the method according to various example embodiments of the present disclosure, the controlling may include adjusting the transmitter power level using the communication module or changing the acoustic attributes for the voice signal.

The method device according to various example embodiments of the present disclosure may further include executing the electronic device associated with the call function at the first level if the biometric information includes the first biometric signal and executing the action of the electronic device associated with the call function at the second level if the biometric information includes the second biometric signal.

The method device according to various example embodiments of the present disclosure may further include controlling the first function of the electronic device if the biometric information includes the first biometric signal and controlling the second function of the electronic device if the biometric information includes the second biometric signal.

The method device according to various example embodiments of the present disclosure may further include controlling the function corresponding to the first function or the second function and controlling at least some functions of the first application to be the first function and at least some functions of the second application to be the second function.

The method device according to various example embodiments of the present disclosure may further include t displaying a first content on the display included in the electronic device if the biometric information includes the first biometric signal and displaying a second content on the display included in the electronic device if the biometric information includes the second biometric signal.

The method device according to various example embodiments of the present disclosure may further include controlling the display based on the execution of the call function, in which the electronic device includes the sensor disposed on the first surface thereof and includes the display disposed on the second surface thereof.

In the method according to various example embodiments of the present disclosure, the electronic device further includes another display formed on the first surface thereof and the controlling may include selectively displaying the information corresponding to the biometric information or the information corresponding to the executed call function on the display or the another display.

In the method according to various example embodiments of the present disclosure, the electronic device may further include controlling the action of the electronic device or the another electronic device based on the information acquired through the another sensor, in which the electronic device includes the sensor disposed on the first surface of the electronic device and the another sensor disposed on the second surface of the electronic device.

According to various example embodiments of the present disclosure, it is possible to acquire biometric information of the user of the electronic device that is on the phone to control at least one function of the electronic device.

According to various example embodiments of the present disclosure, it is possible to adjust the voice output in response to the change in the emotional state of the user of the electronic device.

According to various example embodiments of the present disclosure, it is possible to provide optimized and/or improved call quality for each user by acquiring and using the biometric information of the user.

Hereinabove, the simple structure of the electronic device according to the example embodiments of the present disclosure is described, but the example embodiments of the present disclosure clearly describe that the respective components described above may be more subdivided or combined by those skilled in the art to be reconfigured as at least one module.

Meanwhile, the example embodiments of the present disclosure disclosed in the present disclosure and the accompanying drawings have been provided only for purposes of illustration in order to aid in understanding the present disclosure and do not limit the scope of the present disclosure. Further, the example embodiments of the present disclosure as described above are only examples and it is to be understood that a person having ordinary skill in the art to which the present disclosure pertains can variously change the example embodiments of the present disclosure therefrom and can practice the example embodiments of the present disclosure within the scope of the present disclosure.

What is claimed is:

1. An electronic device, comprising:
   a communication module comprising communication circuitry;
   a sound output device comprising sound output circuitry and disposed on a first surface of the electronic device;
   a sensor disposed on the first surface of the electronic device;
   a display disposed on a second surface of the electronic device opposite to the first surface;
   a processor electrically connected to the communication module, the sound output device, and the sensor; and
   a memory electrically connected to the processor,
   wherein the memory stores instructions which the processor is configured to execute to:
      perform a call function using the communication circuitry of the communication module,
      output a voice signal based on the execution of the call function through the sound output circuitry of the sound output device,
      acquire, via the sensor, biometric information of a user of the electronic device while the call function is executed,
      change at least part of sound attributes of the voice signal of the user based on the biometric information, and
      transmit the changed voice signal to an another electronic device of the call function.

2. The electronic device of claim 1, wherein the memory stores instructions which the processor is configured to execute to acquire a body temperature or a heart rate as at least a part of the biometric information.

3. The electronic device of claim 1, wherein the memory stores instructions which the processor is configured to execute to control an action of the electronic device associated with the call function based on the biometric information.

4. The electronic device of claim 3, wherein the action of the electronic device includes adjusting a transmitter power level using the communication module.

5. The electronic device of claim 1, wherein the memory stores instructions which the processor is configured to execute to perform an action of the electronic device associated with the call function at a first level when the biometric information includes a first biometric signal and to perform the action of the electronic device associated with the call function at a second level when the biometric information includes a second biometric signal.

6. The electronic device of claim 1, wherein the memory stores instructions which the processor is configured to execute to control a first function of the electronic device when the biometric information includes a first biometric signal and to control a second function of the electronic device when the biometric information includes a second biometric signal.

7. The electronic device of claim 6, wherein the memory stores instructions which the processor is configured to execute to control at least some functions of a first application based on the first function and at least some functions of a second application based on the second function.

8. The electronic device of claim 1, wherein the electronic device further includes a display, and
   the memory stores instructions which the processor is configured to execute to display a first content on the display when the biometric information includes a first biometric signal and display a second content on the display when the biometric information includes a second biometric signal.

9. The electronic device of claim 1, wherein the memory stores instructions which the processor is configured to execute to control the display based on the execution of the call function.

10. The electronic device of claim 9, wherein the electronic device further includes another display disposed on the first surface thereof, and
    the memory stores instructions which the processor is configured to execute to selectively display information corresponding to the biometric information or information corresponding to the executed call function on the display or the another display.

11. The electronic device of claim 1, wherein the electronic device further includes the sensor disposed on a first surface of the electronic device and another sensor disposed on a second surface of the electronic device, and
    the memory stores instructions which the processor is configured to execute to control the action of the electronic device or the another electronic device based on the information acquired through another sensor.

12. A method for acquiring biometric information, the method comprising:
    executing a call function via a communication module comprising communication circuitry included in an electronic device;
    outputting a voice signal based on the execution of the call function through a sound output device included in the electronic device;
    acquiring, using a sensor included in the electronic device, biometric information of a user of the electronic device while the call function is executed;
    changing at least part of sound attributes of the voice signal of the user based on the biometric information; and
    transmitting the changed voice signal to an another electronic device of the call function, wherein the electronic device includes the sound output device and the sensor on a first surface and a display on a second surface opposite to the first surface.

13. The method of claim 12, further comprising:
controlling the action of the electronic device associated with the call function based on the biometric information.

14. The method of claim 13, wherein the controlling includes adjusting a transmitter power level using the communication module.

15. The method of claim 12, further comprising:
executing the action of the electronic device associated with the call function at a first level when the biometric information includes a first biometric signal, and
executing the action of the electronic device associated with the call function at a second level when the biometric information includes a second biometric signal.

16. The method of claim 12, further comprising:
controlling a first function of the electronic device when the biometric information includes the first biometric signal; and
controlling a second function of the electronic device when the biometric information includes a second biometric signal.

17. The method of claim 16, wherein the controlling the function corresponding to the first function or the second function includes controlling at least some functions of a first application based on the first function and at least some functions of a second application based on the second function.

18. The method of claim 12, further comprising:
displaying a first content on a display included in the electronic device when the biometric information includes a first biometric signal; and
an action of displaying a second content on the display included in the electronic device when the biometric information includes a second biometric signal.

19. The method of claim 12, further comprising:
controlling the display depending on the execution of the call function.

20. The method of claim 19, wherein the electronic device further comprises another display formed on the first surface of the electronic device, and
the controlling selectively displays information corresponding to the biometric information or information corresponding to the executed call function on the display or the another display.

* * * * *